United States Patent
Bhanoo et al.

(10) Patent No.: US 7,461,206 B2
(45) Date of Patent: Dec. 2, 2008

(54) PROBABILISTIC TECHNIQUE FOR CONSISTENCY CHECKING CACHE ENTRIES

(75) Inventors: Hemant Madhav Bhanoo, Seattle, WA (US); Ozgun A. Erdogan, Seattle, WA (US); Tobias Holgers, Seattle, WA (US); Nevil A. Shah, Redmond, WA (US); Ryan J. Snodgrass, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 289 days.

(21) Appl. No.: 11/466,016

(22) Filed: Aug. 21, 2006

(65) Prior Publication Data

US 2008/0046655 A1 Feb. 21, 2008

(51) Int. Cl.
*G06F 12/00* (2006.01)
*G06F 13/00* (2006.01)
*G06F 13/28* (2006.01)

(52) U.S. Cl. .................. 711/118; 711/133; 711/141; 709/245

(58) Field of Classification Search .................. None
See application file for complete search history.

(56) References Cited

U.S. PATENT DOCUMENTS

2004/0078487 A1* 4/2004 Cernohous et al. .......... 709/245
2005/0060316 A1 3/2005 Kamath et al.
2005/0120040 A1 6/2005 Williams et al.
2005/0204098 A1 9/2005 Martin et al.

OTHER PUBLICATIONS

Cisco Application and Content Networking System Software Caching Configuration Guide 4.1, 2002, Cisco Systmes, Inc., Ch 6, p. 6-1 & 6-2.*
Hou et al., On expiration-based hierarchical caching systems, Jan. 2004, IEEE, vol. 22 Issue 1, pp. 134-150.*
Breslau, Lee et al., "Web Caching and Zipf-like Distributions: Evidence and Implications," IEEE Infocom., vol. XX, No. Y, Mar. 1999.
Cao, Pei and Liu, Chengjie, "Maintaining Strong Cache Consistency in the World-Wide Web," In Proceedings of IEEE Transactions on Computers, 1998, Apr. 1998.
Amazon.com, "Distributed Systems Engineering Job Opportunities," Copyright 2006 Amazon.com, Inc. http://ds.amazon.com/jobs.html [Accessed Jul. 19, 2006].

* cited by examiner

*Primary Examiner*—Reginald G. Bragdon
*Assistant Examiner*—Baboucarr Faal
(74) *Attorney, Agent, or Firm*—Knobbe Martens Olson & Bear LLP

(57) ABSTRACT

A facility for determining whether to consistency-check a cache entry is described. The facility randomly or pseudorandomly selects a value in a range. If the selected value satisfies a predetermined consistency-checking threshold within the range, the facility consistency-checks the entry, and may decide to propagate this knowledge to other cache managers. If, on the other hand, the selected value does not satisfy the consistency-checking threshold, the facility determines not to consistency-check the entry.

21 Claims, 7 Drawing Sheets

PROBABILISTIC TECHNIQUE FOR CONSISTENCY CHECKING CACHE ENTRIES

TECHNICAL FIELD

The described technology is directed to the field of processing requests for data.

BACKGROUND

Caching generally refers to the local storage of data obtained from a remote source to streamline access to this data. FIG. 1 is a network diagram that shows a typical architecture for caching data. It shows a number of data provider nodes such as data providers 110, 120, and 130 that each provide data to a number of data consumer nodes. For example, data provider 110 provides data to consumers including consumers 112 and 113. Each data provider further has a local cache. For example, provider 110 has local cache 111. When a data provider receives a primary data request from one of its consumers, it first checks its local cache to see whether the primary data request can be satisfied from the cache. If so, the provider responds to the primary data request with a response that is based upon cache contents; otherwise, the provider (1) issues a secondary data request to an authoritative data source, (2) responds to the primary data request with a response that is based upon data provided by the data source in response to the secondary data request, and (3) stores the data provided by the data source in response to the secondary data request as an entry in its local cache for use to satisfy future primary data requests. In some cases (not shown), multiple providers may share the same cache. In some cases (not shown), a cache may manage itself, or may be managed by an entity other than the corresponding data provider.

As one example, each data consumer may be a web client requesting web pages or other resources from data providers that are web servers. Data sources may be central data stores or services that provide data that enables the web servers to construct web pages or other resources requested by web clients. Such an architecture employing local caching is described in U.S. patent application Ser. No. 11/177,206, filed on Jul. 8, 2005, which is hereby incorporated by reference in its entirety. Alternatively, data providers may be proxy servers or other intermediate caches—such as caches stored on the same computer system that the web client executes on—that are for one or more web clients and web servers.

The level of efficiency provided by caching data in an environment such as is described above is heavily dependent on how each cache is managed—in particular, the basis used by the cache and/or its data provider to determine for how long a version of a data object stored in a cache entry should be used to satisfy primary requests.

Conventional schemes for maintaining the freshness of cache entries have significant disadvantages. A first conventional scheme involves the use of an object lifetime for each cached data object—a maximum amount of time that the data object should be kept in a cache before expiring the entry containing the object (sometimes referred to as the object's "time to live"). In this scheme, either a data source supplying the data object assigns such an amount of time to the object, or the data provider assigns an amount of time. When a cache entry containing the data object is added to the cache, the assigned amount of time is added to the current time to establish an expiration time for that entry. After the entry's expiration time passes, the entry is expired, and can no longer be retrieved from the cache, and the space it occupies in the cache can be reclaimed for new cache entries.

It is often difficult to select object lifetimes that produce good results. On one hand, if an object lifetime is selected that is too long, the cached object could become "stale"—i.e., it no longer matches the object that the data source that provided it would provide in response to a new secondary data request for the object—and it is of less value to requesting data consumers. On the other hand, if an object lifetime is selected that is too short, the likelihood that the cached object will ever be used to satisfy a primary data request is low, and little benefit is derived from caching the object.

A second conventional scheme for maintaining the freshness of cache entries involves the use of explicit invalidations. Explicit invalidations are notifications sent by a data source to data providers when the data source determines that the version of an object that it would provide in response to a secondary data request has changed, and any cached earlier-provided versions of that object provided by the data source are now stale. When a data provider receives an explicit invalidation notification from a data source, it immediately invalidates the referenced object from its cache, if it is contained there.

While the explicit invalidation scheme has the capacity to overcome the disadvantages associated with the object lifetime scheme, the explicit invalidation scheme has the disadvantage that it consumes substantial processing and/or communication resources. First, detecting a change in the object and sending explicit invalidations often consumes significant processing power on the part of the data source. Once the data source has detected this change, it can either (1) transmit an explicit invalidation to all data providers, incurring significant network bandwidth to convey the explicit invalidation and significant data provider processing costs to act on the explicit invalidation, or (2) itself spend additional processing and storage resource determining which data providers are most likely to have a stale version of the object cached, and send explicit invalidations to only those data providers.

An approach to maintaining the freshness of cache entries that overcame these disadvantages of conventional schemes for invalidating cache entries would have significant utility.

DETAILED DESCRIPTION

A software facility for performing probabilistic cache entry consistency checking ("the facility") is described. The facility permits two amounts of time to be established for each entry: a minimum lifetime specifying a minimum amount of time that the entry will be present in the cache and honored—unless explicitly invalidated—and a maximum lifetime specifying a maximum amount of time that the entry will be honored. If a primary data request that can be satisfied using a cache entry is made at a time before its minimum lifetime has expired, then the facility uses the cache entry to satisfy the primary data request. If a primary data request that can be satisfied using a cache entry is made at a time after its maximum lifetime has expired, then the facility issues a secondary data request to a data source to satisfy the primary data request and updates the cache to reflect the result of the secondary data request. If, however, a primary data request that can be satisfied using a cache entry is made at a time after its minimum lifetime has expired but before its maximum lifetime has been reached, then the facility determines probabilistically whether to use the cache entry or to consistency-check the cached object by issuing a secondary data request. In particular, the facility generates a random or pseudorandom number, and compares it to a probability threshold determined for the object. If the random number is above the probability threshold, the facility uses the cache entry, whereas if the random number is not above the probability threshold, the facility issues a secondary data request to a data source to satisfy the primary data request and updates the cache to reflect the result of the secondary data request.

In some embodiments, where the facility issues a new secondary data request to satisfy the primary data request, the facility compares the new secondary data result to the cached result. If these differ, the facility notifies the managers of other caches to invalidate any entries they have for corresponding objects. In some embodiments, the facility includes the new result in the notification. In some embodiments, the facility includes in the notification a digest for the invalidated cache entry that permits receiving cache managers to efficiently determine whether the sender is invalidating the value it has cached for the object or a different one.

By managing caches in some or all of the ways described above, embodiments of the facility provide good cache performance without consuming an excessive level of resources.

Figure 1:
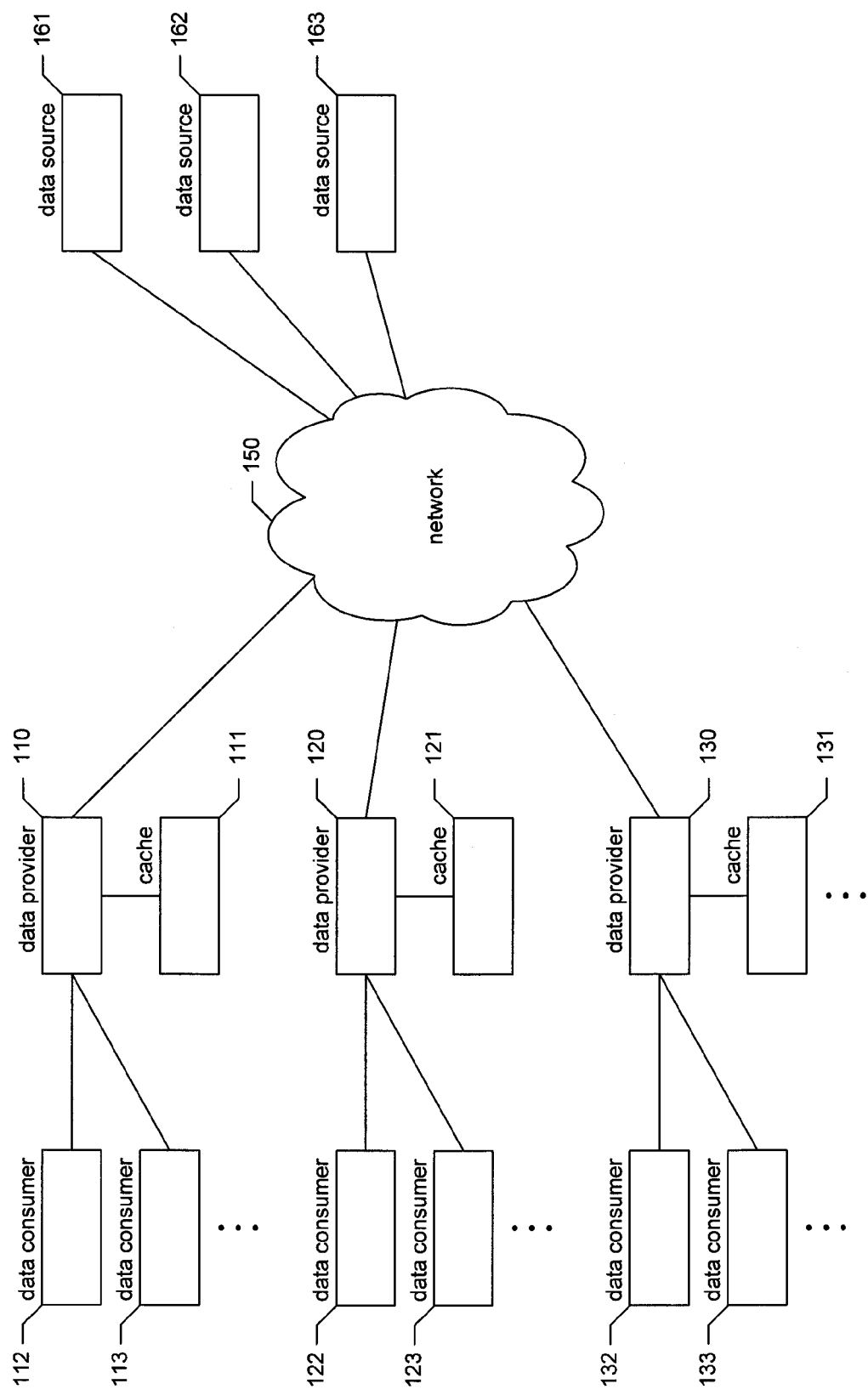
FIG. 1 is a network diagram that shows a typical architecture for caching data.
Figure 2:
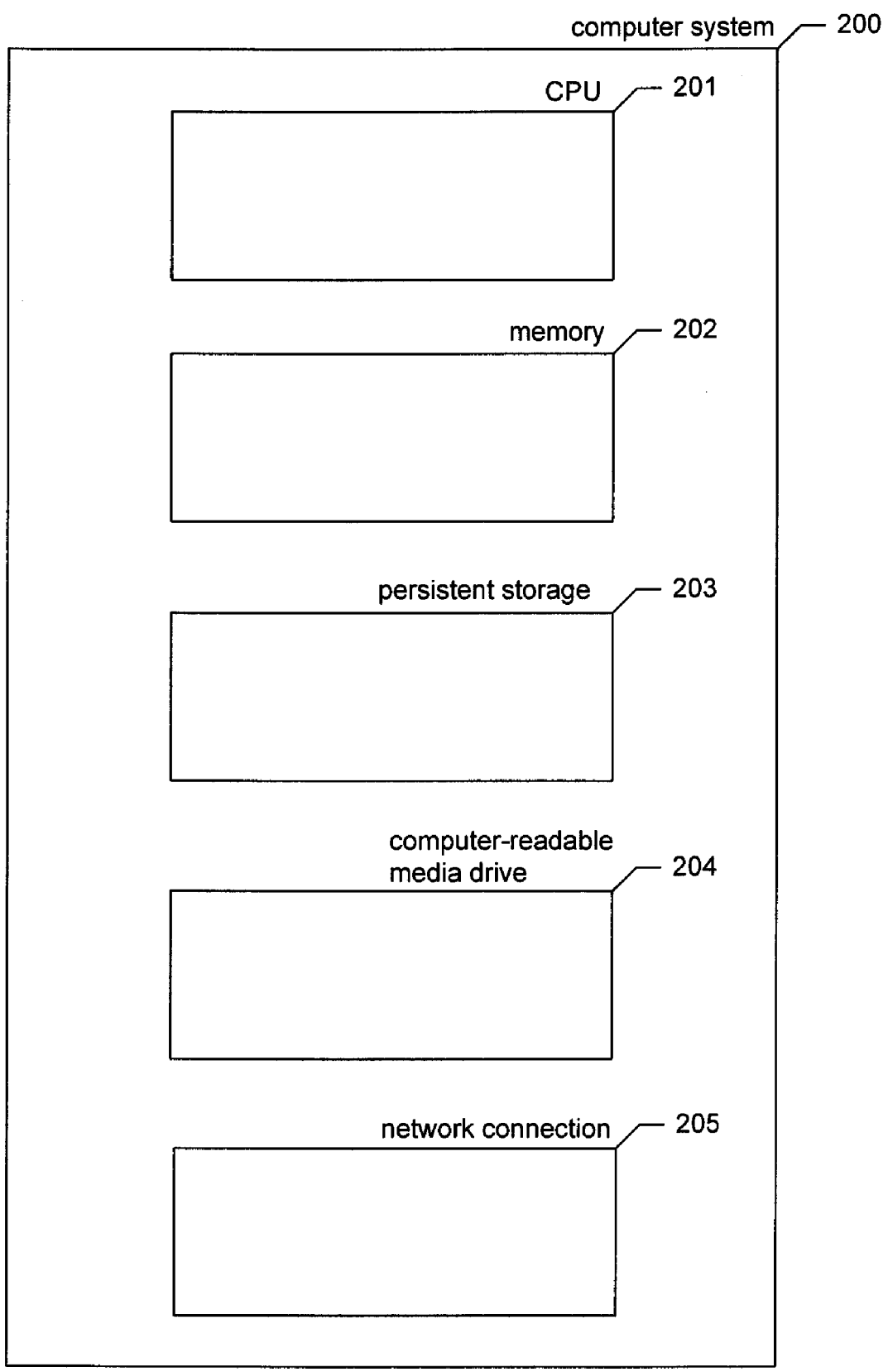
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable medium; and a network connection 205 for connecting the computer system to other computer systems, such as via the Internet. While computer systems configured as described above are typically used to support the operation of the facility, those skilled in the art will appreciate that the facility may be implemented using devices of various types and configurations, and having various components.

Figure 3:
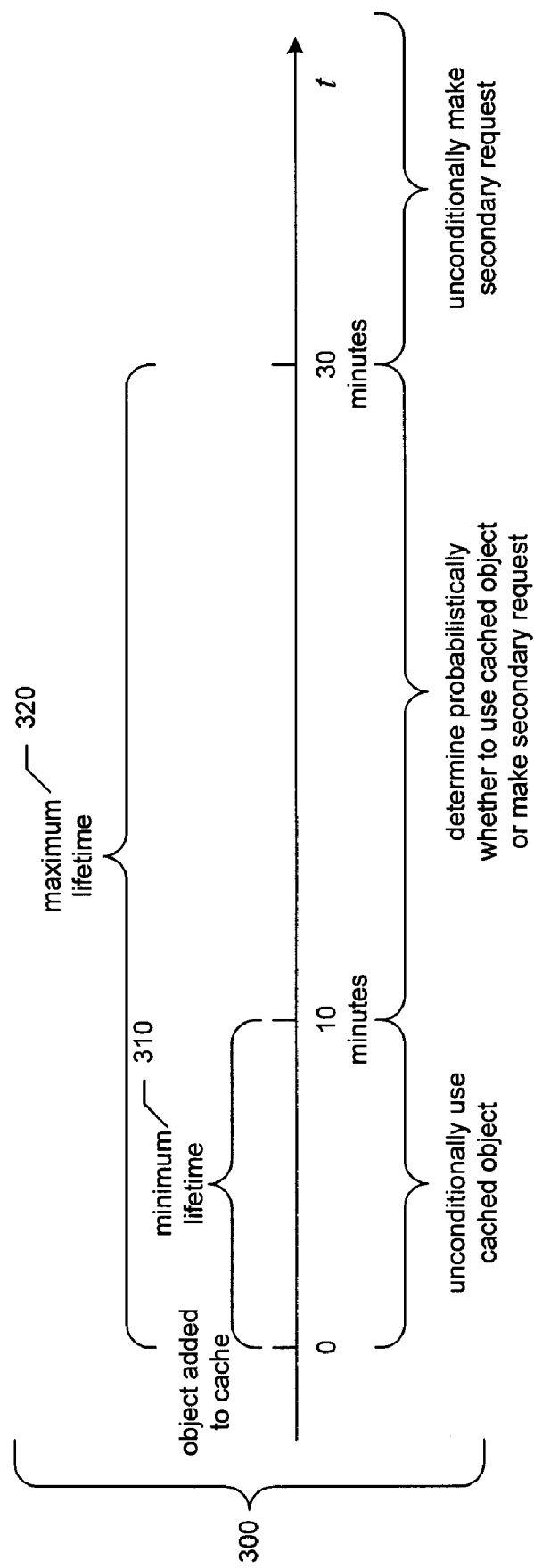
FIG. 3 is a timeline diagram illustrating the operation of the facility.

FIG. 3 is a timeline diagram illustrating the operation of the facility. The diagram shows a timeline 300, in which time progresses to the right. At time zero, an object is added to a cache managed by the facility. At that time, two lifetimes are established for the object: a minimum lifetime 310—here, 10 minutes—and a maximum lifetime 320—here, 30 minutes. The particular length of these lifetimes is configurable in a variety of manners, e.g., may be manually set for individual objects, types of objects, all objects, etc.; or may be automatically set based upon programmatic logic. The minimum lifetime is said to expire at a time obtained by adding a minimum lifetime length determined for the object to the time at which the object is added to the cache. Similarly, the maximum lifetime is said to expire at a time obtained by adding a maximum lifetime length determined for the object to the time at which the object is added to the cache. In some embodiments, the facility later extends the object's two lifetimes in certain situations, such as when a new secondary request returns a version of the object that matches a cached version of the object.

The diagram indicates that, when a primary request is received during the object's minimum lifetime, a response to which requires the object, the facility will unconditionally use the version of the object from the cache to respond to the primary request. The figure further indicates that, when such a request is received after the cached object's maximum lifetime has expired, the facility unconditionally issues a secondary request to obtain a new version of the object. If such a primary request is received after the minimum lifetime has expired but before the maximum lifetime has expired, however, the facility determines probabilistically whether to use the cached version of the object or make a secondary request for the object. In particular, the facility retrieves a configurable probability value in a range representing probabilities between 0% and 100% that the cached object should be consistency-checked, such as 10% in the range between zero and one. It then generates a random number in this range and compares it to this probability threshold. If the random number is below the probability threshold, then the facility consistency-checks the cached object, otherwise it uses the cached object. In some embodiments, the probability threshold is fixed for each object, or across all objects. In some embodiments, the probability threshold for one or more objects is variable, such as increasing over the period from expiration of the object's minimum lifetime to the expiration of its maximum lifetime, or decreasing over this period.

Figure 4:
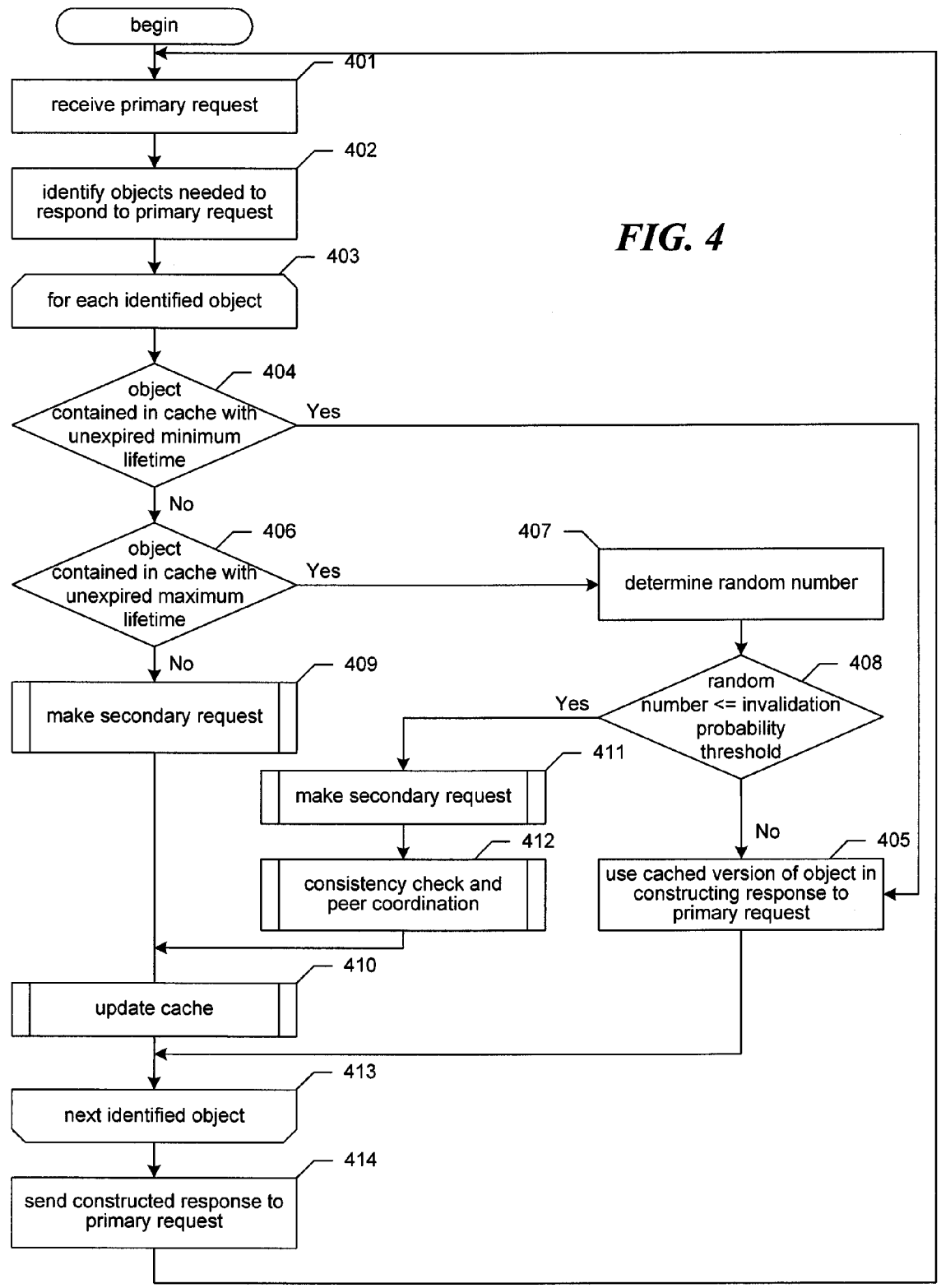
FIG. 4 is a flow diagram showing steps typically performed by the facility to manage a cache while responding to primary requests.

FIG. 4 is a flow diagram showing steps typically performed by the facility to manage a cache while responding to primary requests. In step 401, the facility receives a primary request as described above. In step 402, the facility identifies objects needed to respond to the primary request received in step 401. In some cases, only one object is needed to respond to the primary request, which may be explicitly identified within the primary request. In other cases, the facility must use external resources, such as web page templates, to determine which objects are needed to respond to the primary request. In steps 403-413, the facility loops through each object identified in step 402. In step 404, if a version of the current object is contained in the cache and this cache entry has an unexpired minimum lifetime, then the facility continues in step 405, else the facility continues in 406. In step 405, the facility uses the cached version of the object in constructing a response to the primary request received in step 401. After step 405, the facility continues in step 413.

In step 406, if the cache contains a version of the object in an entry that, while having an expired minimum lifetime, has an unexpired maximum lifetime, then the facility continues in step 407, else the facility continues in step 409. In step 407, the facility determines a random number in a range, such as the range between zero and one. In step 408, if the random number determined in step 407 is less than or equal to the conditional consistency-checking probability threshold, then the facility continues in step 411 to perform a set of steps that amount to consistency checking the cache entry, else the facility continues in step 405 to use the cached version of the object.

In step 409, the facility invokes a make secondary request routine discussed below in connection with FIG. 5 to retrieve an up-to-date version of the object. In step 410, the facility invokes an update cache routine discussed below in connection with FIG. 6 to update the cache to contain the version of the object returned in response to the secondary request. After step 410, the facility continues in step 413.

In step 411, the facility invokes the make secondary request routine. In step 412, the facility invokes a consistency check and peer coordination routine discussed below in connection with FIG. 7 to compare the result of the secondary request made in step 411 to the version stored in the cache and, if different, provide an indication to peer caches, that their cache entries for this object may have expired. After step 412, the facility continues in step 410.

In step 413, if additional identified objects remain to be processed, then the facility continues in step 403 to process the next identified object, else the facility continues in step 414. In step 414, the facility sends a response to the primary request constructed using cached and/or invalidated objects to the sender of the primary request. After step 414, the facility continues in step 401 to receive the next primary request.

Those skilled in the art will appreciate that the steps shown in FIG. 4 and in each of the flow diagrams discussed below may be altered in a variety of ways. For example, the order of the steps may be rearranged; some steps may be performed in parallel; shown steps may be omitted, or other steps may be included; steps may be performed at greater or lesser levels of granularity; etc.

Figure 5:
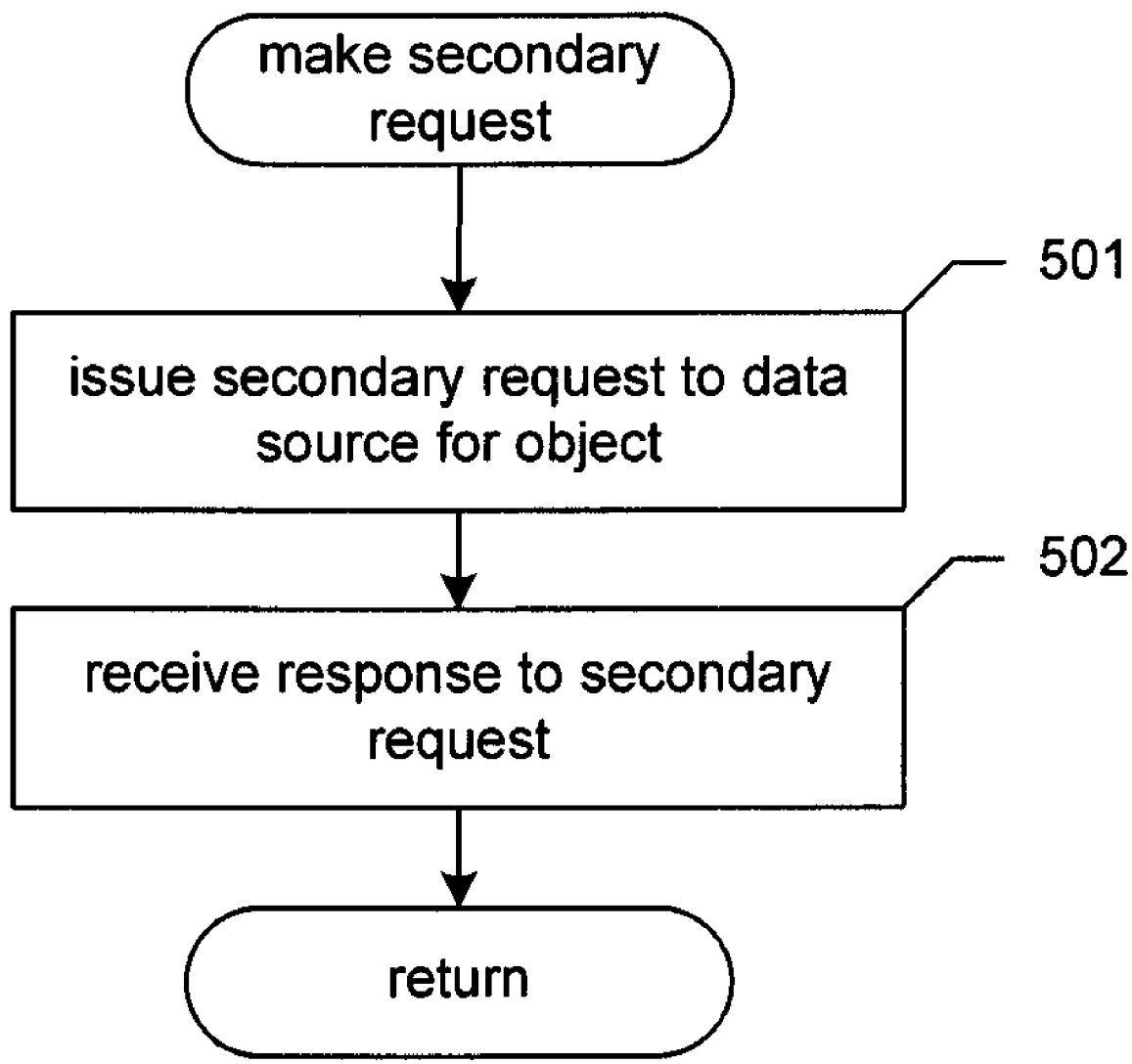
FIG. 5 is a flow diagram showing steps typically performed by the facility as part of the make secondary request routine invoked in FIG. 4.

FIG. 5 is a flow diagram showing steps typically performed by the facility as part of the make secondary request routine invoked in FIG. 4. In step 501, the facility issues a secondary request to the appropriate data source for the object. In step 502, the facility receives a response to the secondary request issued in step 501 from the data source to which it was sent. In some embodiments, step 502 is performed asynchronously with respect to step 501 in an event-driven manner, and is triggered by the arrival of the response of the secondary request. After step 502, the make secondary request routine returns.

Figure 6:
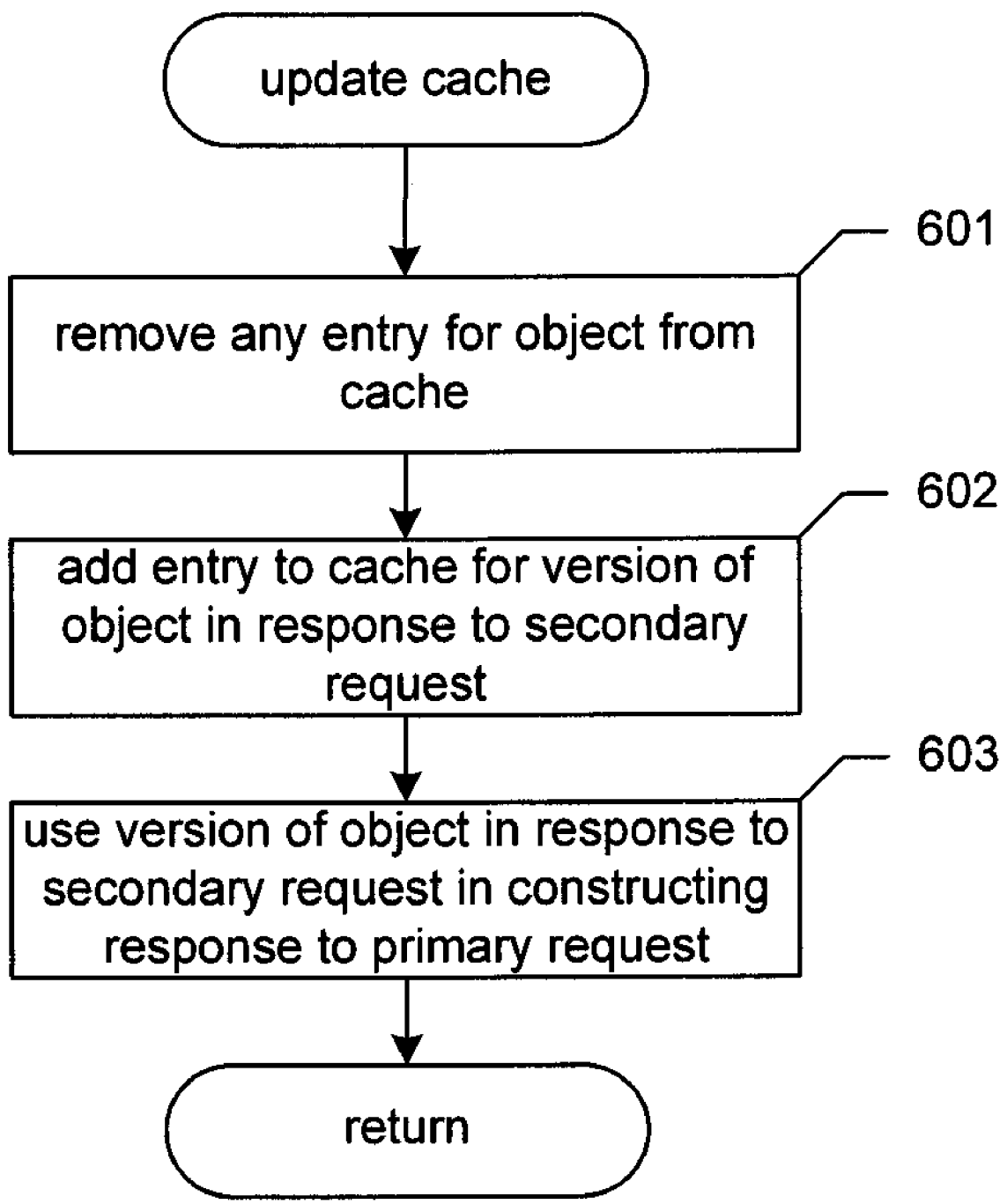
FIG. 6 is a flow diagram showing steps typically performed by the facility as part of the update cache routine invoked in FIG. 4.

FIG. 6 is a flow diagram showing steps typically performed by the facility as part of the update cache routine invoked in FIG. 4. In step 601, the facility removes the entry from the object from the local cache, if it is present there. In step 602, the facility adds an entry to the local cache for the version of the object contained in response to secondary request. The facility typically establishes new minimum and maximum lifetimes for the added entry that are based on the time at which the entry is added to the cache. In some embodiments, where the object was present in the cache, the facility combines steps 601 and 602 to merely update the existing cache entry, rather than removing it and adding a new entry. In step 603, the facility uses the version of the object contained in the response to secondary request in constructing a response to the primary request. After step 603, the facility returns from the invalidate object routine.

Figure 7:
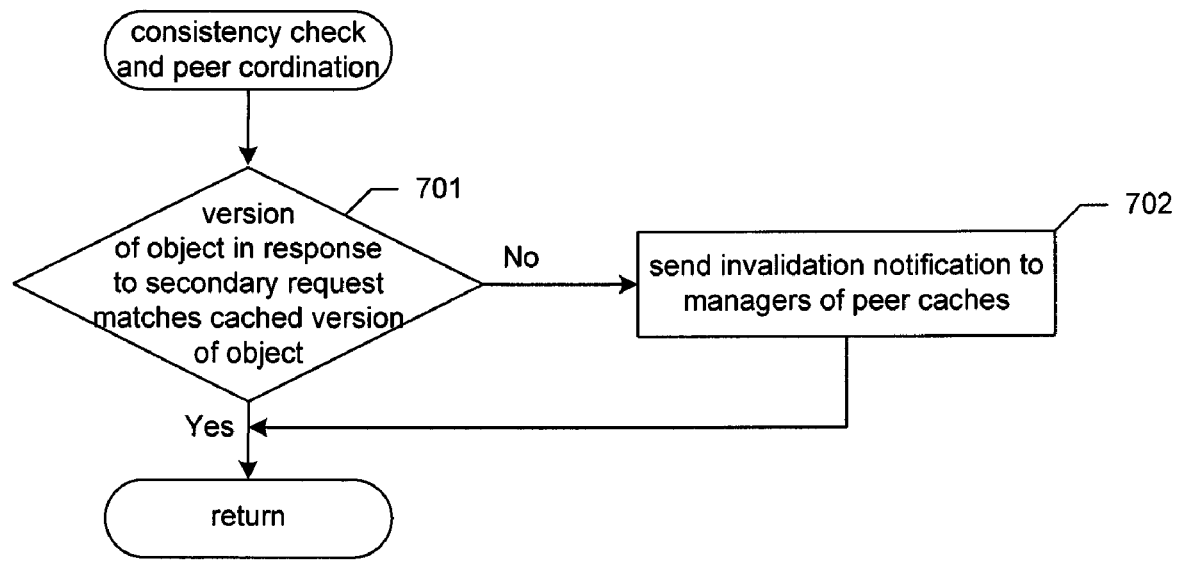
FIG. 7 is a flow diagram showing steps typically performed by the facility as part of the consistency check and peer coordination routine invoked in FIG. 4.

FIG. 7 is a flow diagram showing steps typically performed by the facility as part of the consistency check and peer coordination routine invoked in FIG. 4. In step 701, if the version of the object contained in the response to secondary request matches the cached version of the object, then the facility continues in step 702, else the facility returns from the consistency check and peer coordination routine.

In step 702, the facility sends an invalidation notification to the managers of any peer caches. In some embodiments, the facility sends the invalidation notification from the data provider for the current cache to the data provider for each of the peer caches. In some embodiments, the data provider for this cache sends the invalidation notification to a central clearinghouse for invalidation notifications, which may either forward the invalidation notification to the data provider for each peer cache, or make the invalidation notification available for retrieval by the data providers for any or all of the peer caches. In some embodiments, the invalidation notification contains only information identifying the object, such as an object identifier, other contents of a secondary request used to obtain the object from the appropriate data source, or a cache key used to identify the object within the cache. In such embodiments, a peer cache manager receiving the invalidation notification may remove any matching entry from its own cache, or it may refresh such an entry by issuing its own secondary request for the object to the appropriate data source. In some embodiments, the invalidation notification contains a copy of the new version of the object received in the response to secondary request. In such embodiments, a peer cache manager receiving the invalidation notification substitutes this new version of the object in its own cache, in some embodiments resetting the object lifetimes for the object. In some embodiments, the sent invalidation notification contains a digest representation of the contents of the old version of the object, such as a digest representation generated using a hashing algorithm such as the MD5 hashing algorithm. In such embodiments, peer cache managers receiving invalidation notification only process it if the digest representation of the object contents matches a digest representation of the version of the object that it caches. In some embodiments, the sent invalidation notification contains a digest representation of the new version of the object received in the response to the secondary request. In such embodiments, peer cache managers receiving the invalidation notification only process the invalidation notification in cases where the contained digest representation of the new value does not match a digest representation of the version of the object in its own cache. In some embodiments, the facility varies the particular contents of the invalidation notification based upon the size of the object, or some other attribute of the object. As one example, up to a certain size threshold, the facility may include a complete representation of the object in the invalidation notification, and above that size threshold, include only a digest representation or no representation. After step 702, the facility returns from the consistency check and peer coordination routine.

It will be appreciated by those skilled in the art that the above-described facility may be straightforwardly adapted or extended in various ways. For example, the facility may be used to manage a single cache or multiple peer caches in a variety of different configurations, caching data of a variety of types from services or other data sources of a variety of types. Myriad approaches may be used to set minimum and maximum lifetime durations and invalidation probability thresholds. Different techniques may be used to coordinate between peer caches. While the foregoing description makes reference to particular embodiments, the scope of the invention is defined solely by the claims that follow and the elements recited therein.

We claim:

1. A computer-readable medium whose contents cause a computing system to perform a method for managing a cache, the method comprising:
   receiving a request for an object;
   if the cache does not contain a cached version of the object:
      obtaining a current version of the object from a source associated with the object;
      storing the obtained current version of the object in the cache;
      attributing a minimum lifetime and a maximum lifetime to the current version of the object based upon the time at which the current version of the object was stored in the cache;
      using the current version of the object to respond to the received request;
   if the cache contains a cached version of the object:
      if a minimum lifetime attributed to the cached version of the object has not expired, using the cached version of the object to respond to the received request;
      if the minimum lifetime attributed to the cached version of the object has expired, but a maximum lifetime attributed to the cached version of the object has not expired:
         determining a random or pseudorandom number within a range;
         if the determined number exceeds a probability threshold determined with respect to the range, using the cached version of the object to respond to the received request;
      if the maximum lifetime attributed to the cached version of the object has expired, or if the determined number does not exceed the probability threshold:
         obtaining a current version of the object from the source associated with the object;
         storing the current version of the object in the cache;
         attributing a minimum lifetime and a maximum lifetime to the current version of the object based upon the time at which the current version of the object was stored in the cache; and
         using the current version of the object to respond to the received request.

2. The computer-readable medium of claim 1, further comprising, if the determined number does not exceed the probability threshold:
   determining whether the obtained current version of the object differs from the cached version of the object; and
   if the obtained current version of the object differs from the cached version of the object, sending an invalidation notification to managers of one or more peer caches.

3. A method in a computing system for determining whether to invalidate at a first time a cache entry whose existing contents were stored at a second time, comprising:
   adding to the second time a first amount of time to obtain a third time;
   adding to the second time a second amount of time that is longer than the first amount of time to obtain a fourth time;
   if the first time is before the third time, determining to use the cache entry without consistency-checking the cache entry;
   if the first time is after the fourth time, expiring the cache entry;
   if the first time is between the third and fourth times:
      randomly or pseudorandomly selecting a value in a range;
      if the selected value satisfies a consistency-checking threshold within the range, consistency-checking the cache entry; and
      if the selected value does not satisfy the consistency checking threshold, determining to use the cache entry without consistency-checking the cache entry.

4. The method of claim 3, further comprising determining the consistency-checking threshold to reflect the extent of progression of the first time from the third time to the fourth time.

5. The method of claim 3, further comprising:
   determining that an explicit invalidation notification has been received from a source associated with the contents of the cache entry; and
   in response to so determining, irrespective of the relationship between the first time and the third and fourth times, invalidating the cache entry.

6. The method of claim 3 wherein consistency-checking the cache entry comprises:
   obtaining a current version of the contents of the cache entry from a source associated with the contents of the cache entry; and
   storing the obtained current version of the contents of the cache entry in the cache entry.

7. The method of claim 6, further comprising, before storing the obtained current version of the contents of the cache entry:
   comparing the obtained current version of the contents of the cache entry with the existing contents of the cache entry; and
   if the obtained current version of the contents of the cache entry differ from the existing contents of the cache entry, transmitting an invalidation notification to a manager of a peer cache.

8. The method of claim 7 wherein the invalidation notification identifies a datum for which the contents of the cache entry constitute a value, but does not contain any representation of a value of the datum.

9. The method of claim 8 wherein the manager of the peer cache invalidates a cache entry in the peer cache containing a value for the datum identified by the invalidation notification in response to receiving the invalidation notification.

10. The method of claim 7 wherein the invalidation notification identifies a datum for which the contents of the cache entry constitute a value and a digest representation of the current contents of the cache entry, but does not contain a complete representation of a value of the datum.

11. The method of claim 10 wherein the manager of the peer cache invalidates a cache entry in the peer cache containing a value for the datum identified by the invalidation notification in response to receiving the invalidation notification only if the contents of this cache entry in the peer cache has a digest representation that matches the digest representation contained by the invalidation notification.

12. The method of claim 7 wherein the invalidation notification identifies a datum for which the contents of the cache entry constitute a value and a digest representation of the obtained current version of the contents of the cache entry, but does not contain a complete representation of a value of the datum.

13. The method of claim 12 wherein the manager of the peer cache invalidates a cache entry in the peer cache containing a value for the datum identified by the invalidation notification in response to receiving the invalidation notification only if the contents of this cache entry in the peer cache has a digest representation that differs from the digest representation contained by the invalidation notification.

14. The method of claim 7 wherein the invalidation notification identifies a datum for which the contents of the cache entry constitute a value and a complete representation of the obtained current version of the contents of the cache entry.

15. The method of claim 7, further comprising determining whether to include a complete representation of the obtained current version of the contents of the cache entry based upon the size of the obtained current version of the contents of the cache entry.

16. The method of claim 7, further comprising:

determining an amount of time required to obtain a current version of the contents of the cache entry from a source associated with the contents of the cache entry; and determining whether to include a complete representation of the obtained current version of the contents of the cache entry based upon the determined amount of time.

17. The method of claim 7, further comprising determining whether to include a complete representation of the obtained current version of the contents of the cache entry based upon a cost associated with obtaining a current version of the contents of the cache entry from a source associated with the contents of the cache entry.

18. The method of claim 14 wherein the manager of the peer cache, in response to receiving the invalidation notification:

identifies a cache entry in the peer cache containing a value for the datum identified by the invalidation notification; and storing the obtained current version of the contents of the cache entry contained in the invalidation notification in the identified cache entry of the peer cache.

19. A computer-readable medium whose contents cause a computing system to perform a method for determining whether to check the consistency of a cache entry, the method comprising:

randomly or pseudorandomly selecting a value in a range;

if the selected value satisfies a consistency-checking threshold within the range, consistency-checking the entry; and if the selected value does not satisfy the consistency-checking threshold, determining not to consistency-checking the entry.

20. One or more computer memories collectively containing a cache management data structure for use in managing a cache entry, comprising:

information identifying a time at which a minimum lifetime for the cache entry expires; and information identifying a time at which a maximum lifetime for the cache entry expires, such that it can be determined whether a time at which the cache entry is accessed is before the expiration of the minimum lifetime, after the expiration of the minimum lifetime but before the expiration of the maximum lifetime, or after the expiration of the maximum lifetime, and such that the cache entry may be unconditionally used when accessed before the expiration of the minimum lifetime, the cache entry may be probabilistically consistency-checked when accessed after the expiration of the minimum lifetime but before the expiration of the maximum lifetime, and the cache entry may be unconditionally expired when accessed after the expiration of the maximum lifetime.

21. The computer memories of claim 20 wherein the data structure further comprises information specifying an consistency-checking probability value, such that, when the cache entry is accessed after the expiration of the minimum lifetime but before the expiration of the maximum lifetime, the cache entry may be probabilistically consistency-checked by:

generating a random or pseudorandom value;

if the generated value does not exceed the specified consistency-checking probability value, consistency-checking the cache entry; and if the generated value exceeds the specified consistency-checked probability value, using the cache entry.

\* \* \* \* \*